Figure 1:
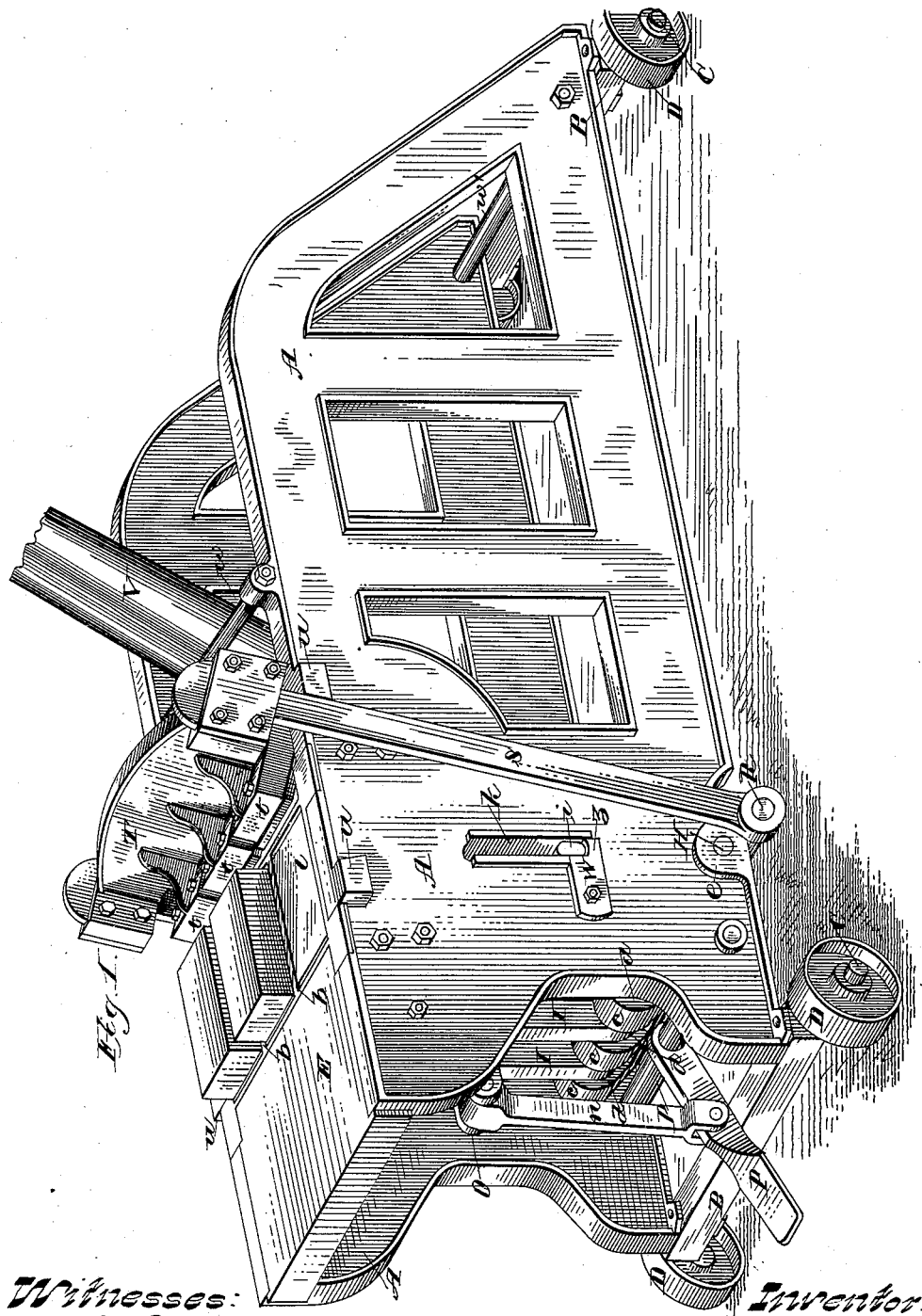

(No Model.) 3 Sheets—Sheet 1.

J. C. PIETZ.
MACHINE FOR MAKING PRESSED BRICK.

No. 343,396. Patented June 8, 1886.

Witnesses:
E. G. Somers
N. E. Oliphant

Inventor:
John C. Pietz
By Stout & Underwood
Attorneys.

N. PETERS. Photo-Lithographer, Washington, D. C.

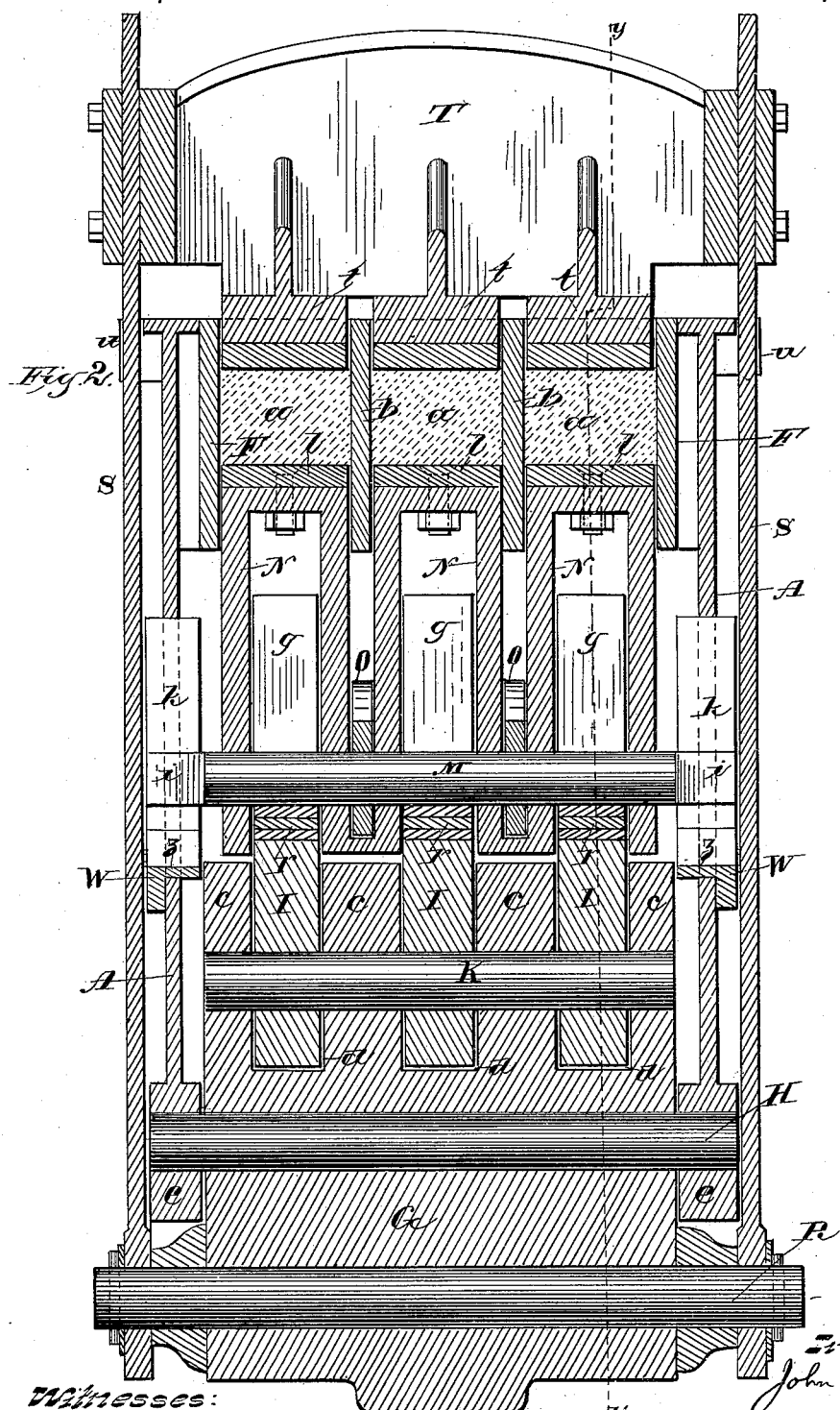

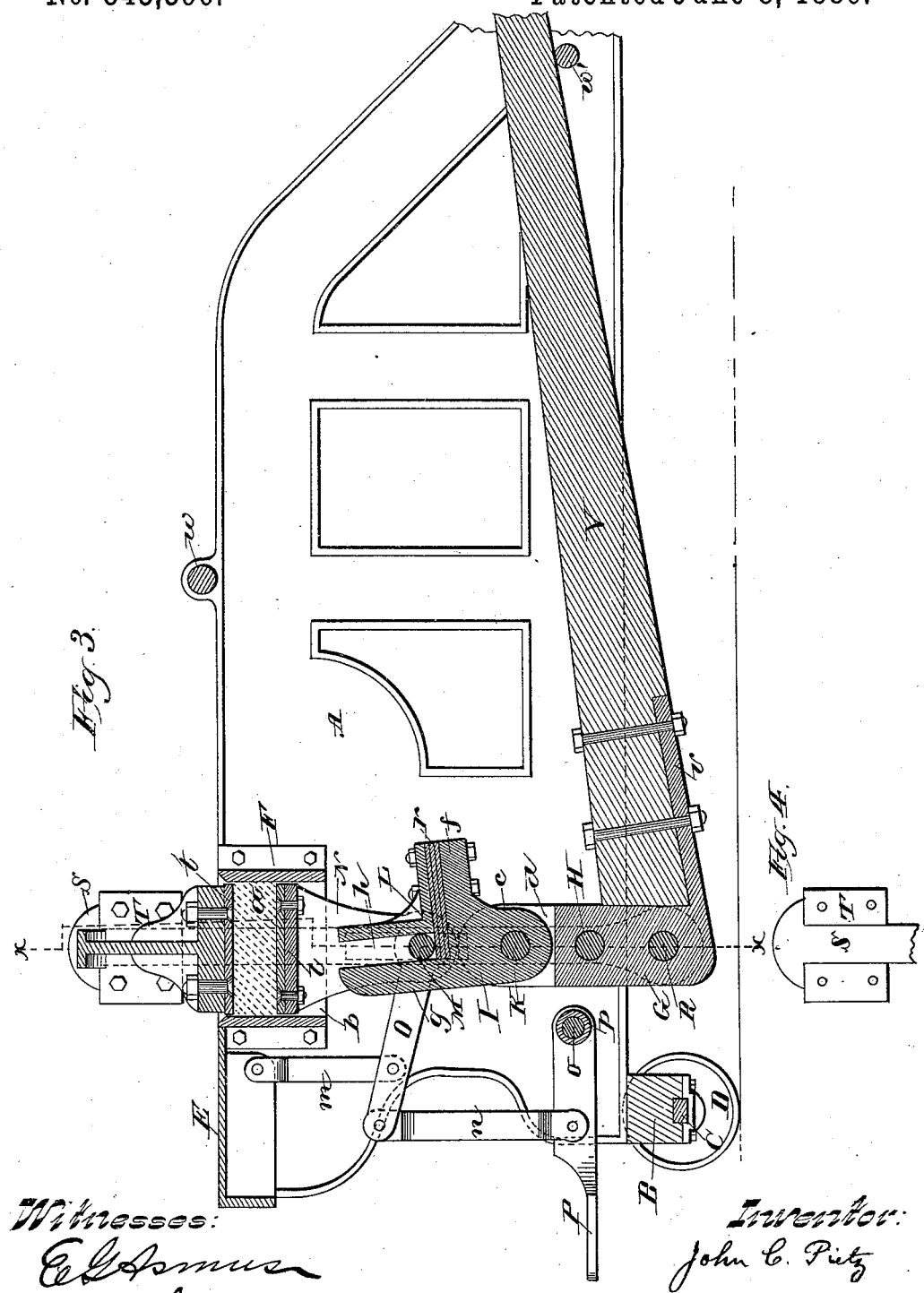

UNITED STATES PATENT OFFICE.

JOHN C. PIETZ, OF MILWAUKEE, WISCONSIN.

MACHINE FOR MAKING PRESSED BRICK.

SPECIFICATION forming part of Letters Patent No. 343,396, dated June 8, 1886.

Application filed October 16, 1885. Serial No. 180,058. (No model.)

*To all whom it may concern:*

Be it known that I, JOHN C. PIETZ, of Milwaukee, in the county of Milwaukee, and in the State of Wisconsin, have invented certain new and useful Improvements in Machines for Making Pressed Brick; and I do hereby declare that the following is a full, clear, and exact description thereof.

My invention relates to brick-machines; and it consists in certain peculiarities of construction, as will be hereinafter described.

In the drawings, Figure 1 represents a perspective view of my brick-machine; Fig. 2, a vertical transverse section drawn to a greatly-enlarged scale on line $x\ x$, Fig. 3; Fig. 3, a central longitudinal section on line $y\ y$ of Fig. 2, and Fig. 4 a detail.

A A represent suitable standards, secured to the housings B of front and rear axles, C, the latter carrying wheels D to facilitate the moving of the machine from place to place. Secured between the standards A, at their upper forward ends, is a table, E, to receive the brick after being pressed in the molds $a$, said molds being formed by partitions $b$ and the sides and ends of a boxing, F, the latter also secured between the standards immediately in the rear of the table.

G is a block, having its upper end formed with a series of alternate ears, $c$, and recesses $d$, and said block is provided with a shaft, H, the ends of which latter are journaled in bearings $e$ in the standards A near their lower forward ends. Adapted to fit in the recesses $d$, between the ears $c$ of the block G, are a series of bell-cranks, I, on a rod, K, said rod being passed through perforations in both the ears and bell-cranks. To the rear arms, $f$, of the bell-cranks are detachably secured angle-irons L. Said angle-irons and the upper arms, $g$, of the bell-cranks, when relatively arranged, form slots $h$, in which operates a shaft, M. This shaft M has its outer extremities, $i$, squared off, and designed to operate in grooves $k$, cut in the standards A to form guides for said shaft.

Rigidly secured to the shaft M, between the standards, are a series of links, N, preferably formed from one continuous and angularly-bent piece, said links being rounded off at their lower ends to clear the correspondingly-formed ears $c$ of the block G, and the upper ends are formed with or have secured thereto pressure-plates $l$, designed to fit the molds $a$.

Journaled to the shaft M are the rear ends of arms O, pivotally connected near their forward ends to hangers $m$, depending from the under side of the table E, and said arms at their extreme forward ends are similarly connected to pendent links $n$, pivoted to a foot-lever, P, this latter part being fulcrumed to a rod, $o$, journaled to the standards A, said rod being provided with sleeves $p$, adapted to come against each side of the foot-lever to retain the same in its proper position.

Between the rear arms, $f$, of the bell-cranks I and the lower arms of the angle-irons L are interposed strips of wood or other suitable material, $r$, on which latter the shaft M has a bearing, and the vertical adjustment of the pressure-plates $l$ may be varied accordingly as these strips $r$ are relatively increased or diminished. Extending through the block G near its lower end is an axle, R, to the projecting ends of which latter are journaled the lower ends of links S, the upper ends of said links being provided with T-shaped heads, as shown in Fig. 4, and suitably secured to a pressure-head, T. This pressure-head is provided with a series of followers, $t$, adapted to snugly fit the brick-molds $a$, located between the standards A, said standards having upon their upper outer sides lugs $u\ u$, which act as stops to limit the play of the links S in a longitudinal direction.

Rearwardly projecting from the lower end of block G is a socket-arm, $v$, adapted to receive and have secured therein the forward end of a lever, V, the up-and-down play of this latter part being regulated by stops $w\ w'$, extending between and secured to the standards A.

In the operation of my invention the clay to be pressed into brick is placed in the molds $a$, and the presser-head T brought forward, so as to bring its followers $t$ into register with said molds. The lever V is now depressed, causing the lower part of the block G to be brought forward, thereby drawing the pressure-head followers down into the molds. This forward movement of the lower end of the block causes its upper end to be swung rearward until said block assumes a vertical position. By this action of the block G the bell-cranks I, pivotally secured between the ears c of said block, are operated to swing forward, and thus elevate the shaft M, bearing in the slots h, formed by the upper arms, g, of said bell-cranks and the angle-irons L. As this shaft is elevated it carries with it the links N, to which are secured the pressure-plates l, adapted to operate in the molds a, and thus the clay in said molds is firmly pressed between these pressure-plates and the followers t of the pressure-head T by the simple depression of the lever V, said plates and followers being operated to approach toward each other, and thereby exert direct pressure upon the clay from two directions. After the operation of pressing the clay in the molds has been accomplished the lever V is raised and the pressure-head T swung back. By depressing the foot-lever P the arms O, pivotally connected to said lever through the medium of the links n, and journaled to the shaft M, operate to elevate said shaft in the slots h k, thus causing the links N, surmounted by the pressure-plates l, to be also operated in an upward direction, and thus raise the brick in the molds to a level with the table E, onto which latter said brick are slid by the operator to be removed by the off-bearer, and the machine is ready for another operation. This construction of a brick-machine is especially adapted for small brick-yards, to permit of pressed brick being readily turned out in paying quantities at small expense, and, by having the machine mounted upon wheels, it may be readily moved from one part of the yard to another. As a further means for varying the vertical adjustment of the pressure-plates l, by raising or lowering the shaft M, I removably secure to the standards A plates W, having angular bearings z, adapted to enter the grooves k and support said shaft. A series of these plates are intended to accompany each machine, and the angular bearings z are to be of various thicknesses, so that as the density of the clay varies one pair of plates may be removed and another set substituted.

Having now fully described my invention, what I claim as new, and desire to secure by Letters Patent, is—

1. In a brick-machine, a pivotal block comprising a series of alternate ears and recesses and operated by a single lever, in combination with a series of bell-cranks pivotally connected to the ears of said block, a loosely-hung shaft supported on the bell-cranks, a series of links secured to said shaft and provided at their upper ends with pressure-plates, a series of molds, and a pressure-head provided with a series of followers, as set forth.

2. In a brick-machine, a pivotal block comprising a series of alternate ears and recesses and operated by a single lever, in combination with a series of bell-cranks pivotally connected to the ears of said block, a loosely-hung shaft having a bearing on the bell-cranks, a series of links secured to said shaft and provided at their upper ends with pressure-plates, a series of molds, a pressure-head provided with a series of followers, and a foot-lever mechanism adapted to operate the pressure-plates independent of the main lever action, as set forth.

3. In a brick-machine, a pivotal block comprising a series of alternate ears and recesses and a lever-socket, a series of bell-cranks pivotally connected to the ears of said block, and a series of angle-irons detachably secured to the bell-cranks, in combination with a loosely-hung shaft operating in slots formed by the bell-cranks and angle-irons, a series of links secured to said shaft and surmounted by pressure-plates, a series of molds adapted to engage the pressure-plates, and a pivotal pressure-head provided with a series of followers also adapted to engage the molds, as set forth.

4. In a brick-machine, two supporting-standards, a series of molds, and a table secured between said standards, in combination with a series of vertically-operated pressure-plates, a series of followers on a vertically-operated pressure-head, and a foot-lever mechanism adapted to elevate the pressure-plates to a level with the top of the molds and table independent of the main actuating mechanism, as set forth.

5. In a brick-machine having a series of molds, the combination, with a pivotally-suspended lever-block comprising a series of alternate ears and recesses, of a pressure-head provided with a series of followers and connected to said block by suitable links, a loosely-hung shaft, a series of links secured to said shaft and carrying pressure-plates, a bell-crank mechanism connecting with the lever-block to vertically operate said shaft and its pressure-plate connections, and a foot-lever mechanism adapted to operate the latter independent of the lever-block, as set forth.

6. In a brick-machine, a mechanism designed to elevate the pressure-plates independent of the main actuating means, said mechanism consisting of arms journaled at their rear ends to a loose shaft that is pivotally connected to said pressure-plates, a foot-lever fulcrumed to a transverse rod, hangers operatively suspending the arms, and pendent links uniting the forward ends of said arms with the foot-lever, as set forth.

7. In a brick-machine, a series of links formed of one continuous angularly-bent piece and carrying a series of pressure-plates, in combination with a shaft rigidly secured to said links and vertically operative in suitable guides, and a series of bell-cranks supporting said shaft and connected to a block that is actuated by a lever, as set forth.

8. In a brick-machine, the combination, with a pivotal lever-block, of bell-cranks pivotally connected to said block, angle-irons detachably united to the cranks, and a packing adapted to be inserted between the rear arms of said cranks and the angle-irons, substantially as and for the purpose set forth.

9. In a brick-machine, a lever-block comprising a series of alternate ears and recesses and pivotally connected to a bell-crank and link mechanism carrying a series of pressure-plates, in combination with a pressure-head provided with a series of followers, said head having a link-connection with the lever-block, as set forth.

10. In a brick-machine, a pivotal block comprising a series of alternate ears and recesses and connected by bell-cranks and links to a series of vertically-operated pressure-plates, and a pressure head having a series of followers and connected by links to the block, and a lever secured at one end in a socket rearwardly extended from said block, as set forth.

11. In a brick-machine, a pivotally-hung block suitably connected to a crank and link mechanism, a series of pressure-plates, and a pressure-head, in combination with a series of suitable molds adapted to engage the pressure-plates and followers on the pressure-head, a lever secured to the pivotally-hung block and designed to cause the pressure-plates and followers to approach or recede from one another as said lever is relatively depressed or elevated, and a foot-lever mechanism adapted to operate the pressure-plates independent of the main lever, substantially as and for the purpose set forth.

12. In a brick-machine, the combination of suitable standards having slots to receive the ends of a loosely-hung shaft, to which latter is secured the links of the pressure-plates, with removable plates having angular bearings adapted to enter the slots in the standards and support the loosely-hung shaft, said plates being constructed in pairs, each pair having its angular bearings of a different thickness, substantially as and for the purpose set forth.

In testimony that I claim the foregoing I have hereunto set my hand, at Milwaukee, in the county of Milwaukee and State of Wisconsin, in the presence of two witnesses.

JOHN C. PIETZ.

Witnesses:
H. G. UNDERWOOD,
MAURICE F. FREAR.